United States Patent
Kasuga

[11] Patent Number: 6,125,091
[45] Date of Patent: Sep. 26, 2000

[54] OPTICAL PICKUP APPARATUS FOR USE WITH VARIOUS TYPES OF OPTICAL DISKS

[75] Inventor: Ikuo Kasuga, Nagano, Japan

[73] Assignee: Sankyo Seiki Mfg Co., Ltd., Nagano-ken, Japan

[21] Appl. No.: 09/070,001

[22] Filed: Apr. 30, 1998

[30] Foreign Application Priority Data

May 6, 1997 [JP] Japan .................................... 9-115484

[51] Int. Cl.[7] ...................................................... G11B 7/00
[52] U.S. Cl. ............................................ 369/112; 369/110
[58] Field of Search .................................. 369/109, 110, 369/112, 44.23

[56] References Cited

U.S. PATENT DOCUMENTS

| | | | |
|---|---|---|---|
| 4,908,813 | 3/1990 | Ojima et al. | 369/94 |
| 5,627,814 | 5/1997 | Lee | 369/44.37 |
| 5,661,711 | 8/1997 | Tanaka et al. | 369/112 |
| 5,793,734 | 8/1998 | Tsuchiya et al. | 369/44.37 |
| 5,835,472 | 11/1998 | Horie et al. | 369/112 |
| 5,856,965 | 6/1999 | Tsuchiya et al. | 369/110 |
| 5,933,401 | 8/1999 | Lee et al. | 369/112 |
| 5,974,020 | 10/1999 | Ju et al. | 369/110 |
| 5,999,509 | 12/1999 | Sugiura et al. | 369/112 |

*Primary Examiner*—Nabil Hindi
*Attorney, Agent, or Firm*—Reed Smith Shaw & McClay LLP

[57] ABSTRACT

An optical pickup apparatus comprises a first semiconductor laser, a first beam splitter which partially reflects or transmits a laser beam generated by the first semiconductor laser in a given direction, a second semiconductor laser which emits a laser beam having a different wave length from the laser beam of the first semiconductor laser, a second beam splitter which partially reflects or transmits the laser beam generated by the second semiconductor laser in a given direction, a single photodetector which receives laser beams from the first and second semiconductor lasers when the laser beams are reflected by a recording medium, and a first reflective portion which is formed on the first beam splitter. The first reflective portion partially reflects a given polarized light beam from the first semiconductor laser and transmits a polarized light beam from the second semiconductor laser beam, which differs from the given polarized light beam. A second reflective portion is formed on the second beam splitter. The second reflective portion partially reflects a given polarized light beam from the second semiconductor laser and transmits a polarized light beam from the first semiconductor laser beam, which differs from the given polarized light beam.

5 Claims, 4 Drawing Sheets

Figure 7

| Wavelength | 650 nm | | 780 nm | |
|---|---|---|---|---|
| Directions of Polarization | P | S | P | S |
| First slope | T > 90% | — | — | T = R = 50% |
| Second slope | T = R = 50% | — | — | T > 90% |

T: transmissivity
R: reflectivity

OPTICAL PICKUP APPARATUS FOR USE WITH VARIOUS TYPES OF OPTICAL DISKS

BACKGROUND OF THE INVENTION a) Field of the Invention

The present invention relates to an optical pickup apparatus used in an optical disk device, in particular, it relates to an optical pickup apparatus which can be commonly used for recording media having protective layers with a different thickness.

b) Description of the Related Art

Conventional compact discs ("CDs" hereafter) have been widely used as optical discs on which information signals are optically recorded. Recently, with progress in technology to densify optical discs, digital video discs ("DVD" hereafter), in which animated images with a length of several hours can be written in and read from an optical disc with a diameter same as a CD, has come into actual use. Currently, various kinds of optical pickup apparatuses are suggested for reading both CDs and DVDs. Although CDs and DVDs share basic principles, they differ in the thickness such that CDs have a thickness of 1.2 mm while DVDs have a thickness of 0.6 mm, which is a half of the thickness of CDs. Therefore, in order to realize an optical pickup apparatus for reading both CDs and DVDs, it is required to be structured such that spherical aberrations due to differences in the disc thickness are canceled.

Examples to realize an optical pickup apparatus for reading both CDs and DVDs are an objective lens switching method and a compensation device method. Both of these methods utilize a common light source. In the objective lens switching method, two objective lenses facing optical discs are used for CDs and DVDs, which are switched according to which type of disc is read; in the compensation device method, spherical aberrations due to the differences in the disc thickness are canceled by a compensation device.

Both CDs and DVDs are optical discs which share basic principles. However, in an optical pickup device for CDs, a semiconductor laser with a wavelength of 780 nm as a light source is used, while a semiconductor laser with a short wavelength of 650 to 630 nm is used as a light source in an optical pickup device for DVDs. Hence, in order to enable reading of both CDs and DVDs using a common light source as described above, a semiconductor laser with a short wavelength of 650 to 630 nm shall be used as a light source. Also, there is no negative effect, such as damaging a reflective film of CDs, caused by reading CDs with such a short wavelength laser. As a result, if a semiconductor laser with a short wavelength of 650 to 630 nm is applied as a light source, the semiconductor laser can be commonly used for CDs and DVDs by switching objective lenses or by using a compensation device.

Nonetheless, CDs have been developed in various modes; for example, CD-Rs are capable of addition and writing. The reflective film of the CD-R is designed such that maximum performance can be obtained by using a laser for CDs with a wavelength of 780 nm, therefore, the reflective film is said to be highly dependent of wavelength. As a result, in the case of using a semiconductor laser with a short wavelength of 650 to 630 nm in order to be applicable for both CDs and DVDs, as described above, the reflective film of the CD-R cannot reflect the short wavelength laser beam, therefore, information signals recorded on the CD-R cannot be reproduced. In addition, when such a short wavelength laser beam is irradiated on the reflective film of the CD-R, the reflective film is heated by absorbing the short wavelength laser beam such that it could be damaged.

In order to realize an optical pickup apparatus which can be commonly used for CDs and DVDs and which can read CD-Rs, in general, it is possible to use a plurality of kinds of light sources corresponding to kinds of recording media, as well as to connect detecting devices corresponding to each of the light sources for selecting a light source and a detecting device corresponding to the kind of used recording media. However, an increase in the number of parts causes increased costs in addition to inconvenience that the detecting device has to be switched corresponding to the kind of the used recording medium.

OBJECT AND SUMMARY OF THE INVENTION

In consideration of the above issues, the primary object of the present invention is to provide an optical pickup apparatus in which:

for reading CDs and DVDs, a common optical system and a single photo detector are used;

signals on CD-Rs can be read without damaging the reflective film;

a loss of luminous energy is small;

dependency of the reflective film to angles is low such that stable performance is obtained; and stable reading can be performed on a recording medium with a large birefringence.

In accordance with the invention, an optical pickup apparatus comprises a first semiconductor laser, a first beam splitter which partially reflects or transmits a laser beam generated by the first semiconductor laser in a given direction, a second semiconductor laser which emits a laser beam having a different wave length from the laser beam of the first semiconductor laser, a second beam splitter which partially reflects or transmits the laser beam generated by the second semiconductor laser in a given direction, a single photodetector which receives laser beams from the first and second semiconductor lasers when the laser beams are reflected by a recording medium, and a first reflective portion which is formed on the first beam splitter. The first reflective portion partially reflects a given polarized light beam from the first semiconductor laser and transmits a polarized light beam from the second semiconductor laser beam, which differs from the given polarized light beam. A second reflective portion is formed on the second beam splitter. The second reflective portion partially reflects a given polarized light beam from the second semiconductor laser and transmits a polarized light beam from the first semiconductor laser beam, which differs from the given polarized light beam.

BRIEF DESCRIPTION OF THE DRAWINGS

In the drawings:

FIG. 7 is a table showing characteristics of transmissivity and reflectivity of the first slope and the second slope required according to wavelengths and kinds of polarized beams in the above embodiment.

DESCRIPTION OF THE PREFERRED EMBODIMENTS

Embodiments of the optical pickup apparatus of the present invention are described herein with reference to the drawings.

Figure 1:
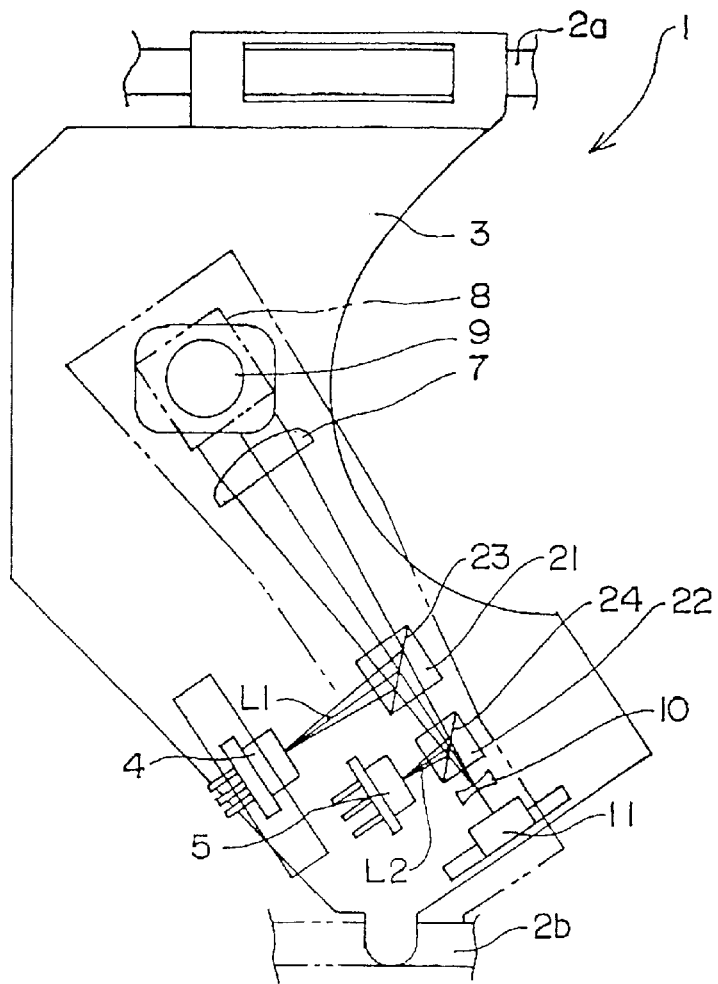
FIG. 1 is a plan view showing an embodiment of an optical pickup apparatus of the present invention.
Figure 2:
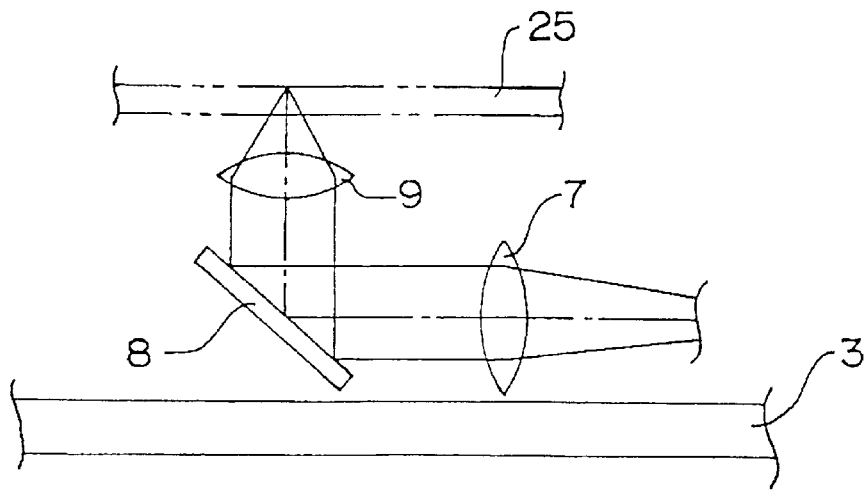
FIG. 2 is an optical configuration showing a structure of the vicinity of a collimator lens a an objective lens in the above embodiment.

In FIGS. 1 and 2, optical pickup apparatus 1 comprises base 3 which is contactingly attached along two guide shafts 2a, 2b attached in parallel with the frame (not illustrated) of the apparatus. The optical system described herein is constructed on base 3.

Figure 3:
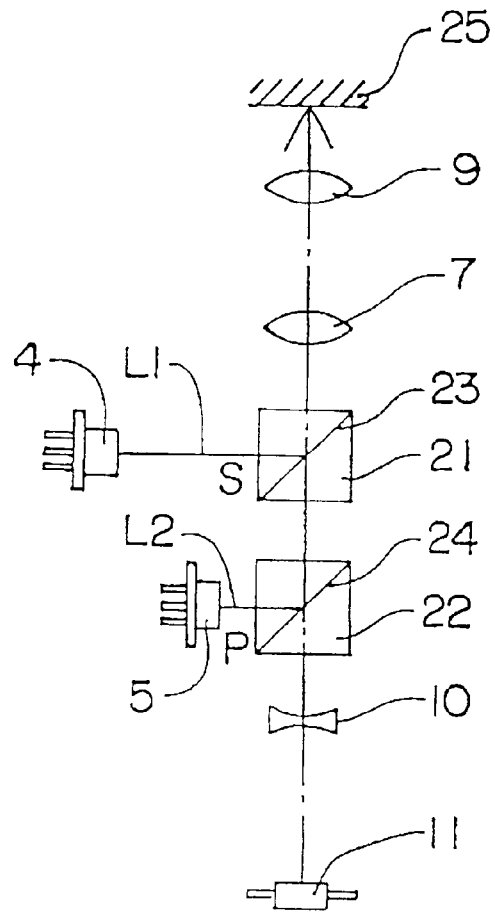
FIG. 3 is an optical configuration of the above embodiment.

As shown in FIG. 3, the optical system of optical pickup apparatus 1 comprises first semiconductor laser 4 which emits first laser beam L1 and second semiconductor laser 5 which emits second laser beam L2; wherein first and second laser beams L1, L2 emitted from semiconductor lasers 4, 5 are guided to a common optical path, thereby performing reading/writing of any data storage media 25 including CDs, CD-Rs, and DVDs.

The common optical path is constructed with first beam splitter 21, second beam splitter 22, collimator lens 7, mirror 8, objective lens 9, sensor lens 10 and photo detector 11.

First semiconductor laser 4 and second semiconductor laser 5 are in conjugate with single photo detector 11 and collimator lens 7.

First semiconductor laser emits laser beam L1 of 780 nm wavelength for reading CDs. Second semiconductor laser 5 emits laser beam L2 of 650 to 630 nm wavelength which is shorter than the laser beam of first semiconductor laser 4. First semiconductor laser 4 and second semiconductor laser emit laser beams L1, L2 in parallel to each other.

Laser beam L1 enters first slope 23 such as a first reflective portion of first beam splitter 21 comprising a prism; laser beam L2 enters second slope 24 such as a second reflective portion of second beam splitter 22 comprising a prism. First slope 23 and second slope 24 are arranged in parallel to each other and also are slanted 45 degree from the axial center of laser beams L1, L2. In addition, multi-layer films are formed on each of slopes 23 and 24 to reflect laser beams L1 and L2 for guiding to the same direction (upper left in FIG. 1). Laser beam L1 is S-polarized with respect to first and second slopes 23 and 24; laser beam L2 is P-polarized with respect to second slopes 23 and 24.

Multi-layer films are formed on first slope 23 and second slope 24 to adjust optical transmissivity and reflectivity on these slopes to an appropriate value. The multi-layer films formed on first slope 23 functions as a half mirror to S-polarized laser beam L1 partially reflecting the laser beam while it transmits P-polarized laser beam L2. The multi-layer film formed on second slope 24 functions as a half mirror formed to P-polarized laser beam L2 partially reflecting the laser beam while it transmits S-polarized laser beam L1.

FIG. 7 shows an example of a design for spectroscopic characteristics of first slope 23 and second slope 24. In FIG. 7, "T" indicates a transmissivity, "R" indicates reflectivity, and "-" indicates an arbitrary value. In this design example, first slope 23 has more than 90% of transmissivity to laser beam L2, that is a P-polarized beam of 650 nm wavelength, so that most of the P-polarized beam of 650 nm wavelength is transmitted; on the other hand, it has 50% of transmissivity and reflectivity to laser beam L1, that is S-polarized laser beam of 780 nm wavelength, so that it functions as a half mirror to laser beam L1. Second slope 24 functions as a half mirror to the P-polarized beam of 650 nm wavelength (laser beam L2) with 50% transmissivity and reflectivity while it transmits most of the S-polarized beam of 780 wavelength (laser beam L1) with more than 90% transmissivity. Other characteristics are arbitrary.

Figure 4:
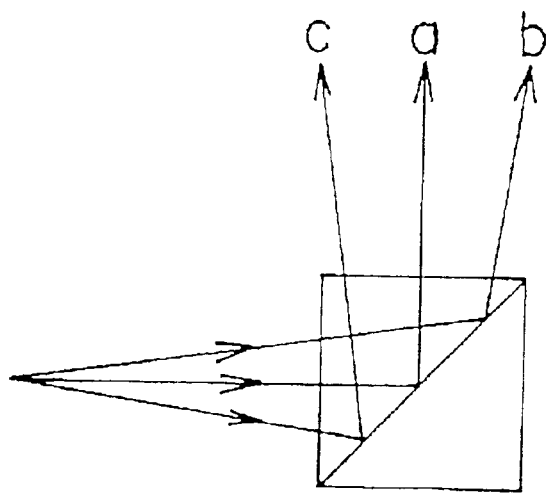
FIG. 4 is an optical figure showing reflection of diffuse light by a beam splitter in t above embodiment.
Figure 5:
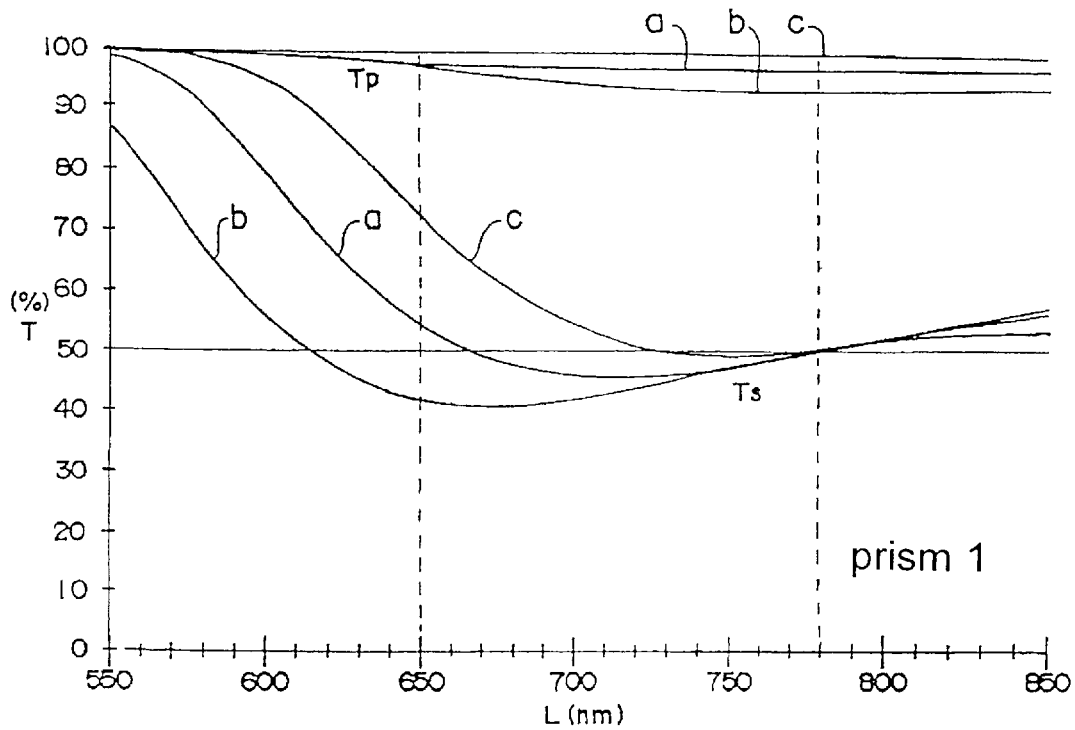
FIG. 5 is a graph showing an example of spectroscopic characteristics of e first slope used in the above embodiment.
Figure 6:
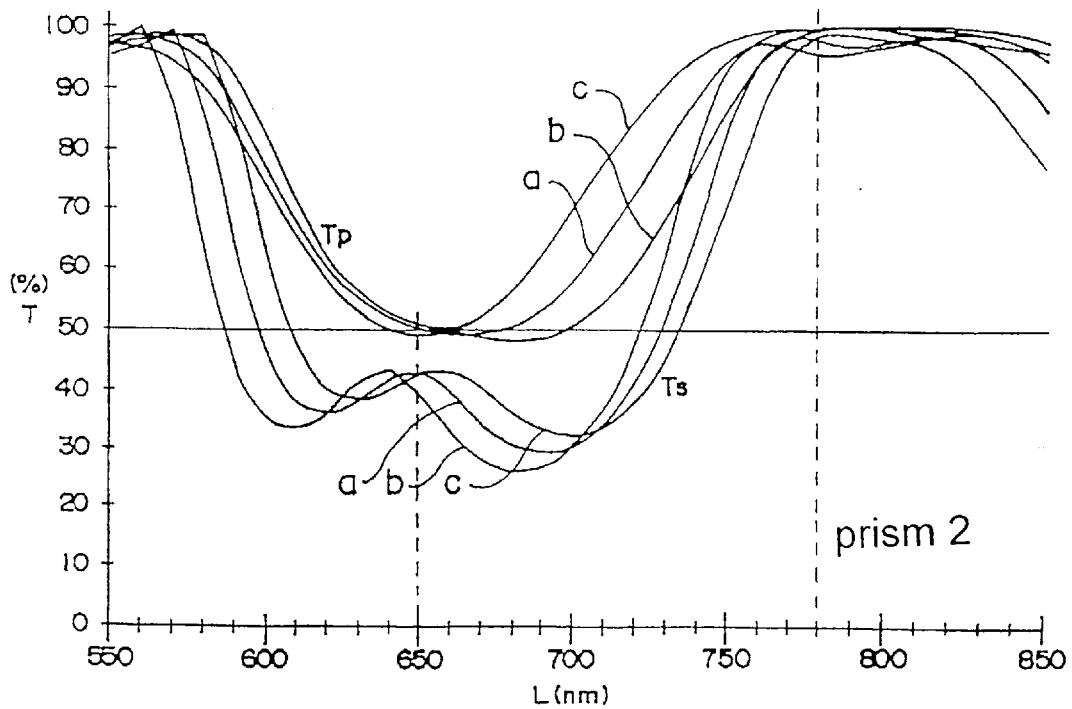
FIG. 6 is a graph showing an example of spectroscopic characteristics of second slope used in the above embodiment.

FIG. 5 shows the spectroscopic characteristics of first slope 23 as mentioned above. FIG. 6 shows the spectroscopic characteristics of second slope 24 as mentioned above. In FIGS. 5 and 6, Tp indicates transmittivity with respect to the P-polarized laser beam; Ts indicates transmittivity with respect to the S-polarized laser beam. First and second slopes 23, 24 are structured with multi-layer film coated as mentioned above. The more layers, the more dependency to angles the film has, thereby providing different transmissivity for different incidence angles. As shown in FIG. 4, spectroscopic characteristics of first and second slopes are different for laser beams a, b, c where; a is a laser beam which enters the slopes at 45 degree angle and is reflected; b is a laser beam which enters the slopes at a larger angle and is reflected; and c is a laser beam which enters the slope at a smaller angle and is reflected. Therefore, in FIGS. 5 and 6, spectroscopic characteristics are shown according to each of the laser beams a, b and c.

In the example of the spectroscopic characteristics shown in FIG. 5, first slope 23 has a good transmissivity to the P-polarized beam of 650 wavelength (laser beam L2); also, it has both transmissivity and reflectivity at about 50% to the S-polarized beam of 780 wavelength (laser beam L1) to satisfy the characteristics required for first slope 23 of the design example shown in FIG. 7. In the example of the spectroscopic characteristics of second slope 24 shown in FIG. 6, on the other hand, transmissivity to the P-polarized beam of 650 wavelength is about 50%, that is reflectivity is also about 50%; also, transmissivity to the S-polarized beam of 780 wavelength is high so that the characteristics required for second slope 24 of the design example shown in FIG. 7 are satisfied.

Furthermore, it is obvious from FIGS. 5 and 6 that first and second slopes 23, 24 have low dependency to angles at critical points on the characteristics curves. This is due to the fact that it is relatively easy to satisfy the above required characteristics such that a small number of layers for the multi-layer films is needed to satisfy the required characteristics. The fact that first and second slopes have low dependency to angles is advantageous in terms of minimizing the size of the optical pickup apparatus. In other words, if dependency to angles are low in the spectroscopic characteristics of first and second slopes 23, 24, as shown in FIG. 4, positioning the slopes at emitting portions of laser beams does not have much effect so that it is not necessary to position the slopes in parallel light beams, that is, an infinity optical system. Hence, there is not much impact even when a beam is emitted directly from the semiconductor laser into the slope for reflection without placing a collimator lens between the semiconductor laser and the slope. Therefore, it is advantageous that the number of parts decreases since the collimator lens is unnecessary as well as that the size of the optical pickup apparatus can be reduced.

First slope 23 of first beam splitter 21 and second slope 24 of second beam splitter 22 could logically be constructed as a standard half mirror. However, if first and second slopes 23, 24 are constructed as a standard half mirror, luminous energy would decrease to about ⅛th during the time when laser beams are emitted from semiconductor lasers 4, 5; this would be problematic in actual practice. In contrast, according to the mode of the above embodiment, luminous energy does not decrease while laser beams L1, L2 are emitted from semiconductor lasers 4, 5 and reach photo detector 11; the amount of luminous energy reaching photo detector 11 is twice the amount in the case of using the above standard half mirror. As a result, errors in reading signals recorded on recording media 25 can be reduced.

Also, a conventional polarizing type using a ¼ plate and a polarizing beam splitter is effective in terms of laser beam L1 emitted from first semiconductor laser 4 and laser beam L2 emitted from second semiconductor laser 5 to effectively enter photo detector 11. In other words, a linearly polarized laser beam emitted from the semiconductor laser is reflected by the polarized beam splitter and converted to a circularly polarized beam by the ¼ plate. Then, the laser beam, which returns as a circularly polarized beam after being reflected by a disc, is transmitted through the ¼ plate again such that it is converted to a linearly polarized beam which is perpendicular to the original linearly polarized beam. This polarizing type provides a high efficiency in use of the laser beams; however, it does not correspond well to birefringence of recording media such that reading cannot be performed if there is birefringence. On the contrary, this embodiment is a non-polarizing type by eliminating the ¼ plate; therefore, birefringence on recording media does not affect the process as much, and errors in reading signals recorded on recording media 25 can be reduced.

Recording media 25 comprises a reflective film which is protected by a transparent protection film with an even thickness. The above mentioned recording tracks are formed on the reflective film. The reflected beam by the reflective film of recording media returns going through in order, objective lens 9, mirror 8 and collimator lens 7; then it is transmitted through first slope 23 of first beam splitter 21 and second slope 24 of second beam splitter 22. After passing through sensor lens 10, the beam is detected by photo detector 11. Wave length 780 nm of laser beam L1 emitted from first semiconductor laser 4 and wavelength of 650 to 630 nm emitted from second semiconductor laser 5 are reflected on recording media with a different thickness; then they are detected by single photo detector 11. In other words, first and second semiconductor lasers 4 and 5 are placed optically conjugate with above single photo detector, respectively. As a result, laser beam L1 or laser beam L2, reflected by recording media 25, is converged onto the photo detecting surface of photo detector 11.

As is widely known, photo detector 11 comprises quarterly split devices and the like. When the laser beam converged onto these devices can be deviated on the split devices, tracking errors and focusing errors are detected. Objective lens 9 is driven in the tracking direction or the focusing direction according to the tracking error detecting signals or focusing error detecting signals such that tracking control and focusing control are performed. It is also known that signals recorded on recording media 25 are detected by the split devices.

The following briefly explains the operation of the above embodiment. To regenerate CDs or CD-Rs, S-polarized laser beam L1 is emitted at a wavelength of 780 nm from first semiconductor laser 4 to the reflective surface of the beam splitter. 50% of laser beam L1 is reflected on first slope 23, then converged on the recording tracks of the CD or CD-R after passing through collimator lens 7, mirror 8 and objective lens 9. Once laser beam L1 is reflected on the CD or CD-R, it goes back passing through in order, objective lens 9, mirror 8, and collimator lens 7. Then, 50% of the laser beam is transmitted through first slope 23; most of the transmitted beam is transmitted through second slope 24. Thereafter, it enters photo detector 11 via sensor lens 10. By a detecting output of photo detector 11, regeneration of the CD or CD-R is carried out, as well as detection of tracking and focusing.

To regenerate DVDs, P-polarized laser beam L2 is emitted at a wavelength of 650 nm from second semiconductor laser 5 to the reflective surface of the beam splitter. 50% of laser beam L2 is reflected at second slope 24. Most of the reflected beam is transmitted through first slope 23, then converged on the recording tracks of the DVD after passing through collimator lens 7, mirror 8 and objective lens 9. Laser beam L2 reflected on the DVD goes back passing through in order, objective lens 9, mirror 8, and collimator lens 7. 50% of the beam is transmitted through first slope 23, then, most of the transmitted beam is transmitted through second slope 24. Thereafter, it enters photo detector 11 via sensor lens 10. By a detecting output of photo detector 11, regeneration of the DVD is carried out, as well as detection of tracking and focusing.

According to the above explained embodiment, laser beam L1 from first semiconductor laser 4 is to be S-polarized in relation with the reflective surface of the beam splitter; laser beam L2 from second semiconductor laser 5 is to be P-polarized. Splitters 21, 22 comprise first slope 23 which partially reflects laser beam L1 from first semiconductor laser 4 and which transmits laser beam L2 from second semiconductor laser 5; and second slope 24 which partially reflects laser beam L2 from second semiconductor laser 5 and which transmits laser beam L1 from first semiconductor laser. Therefore, the lost amount of laser beams L1, L2, which are emitted from first and second semiconductor lasers 4, 5, is small such that by allowing laser beams L1, L2 to effectively enter the photo detector, reading can be reliably performed. Also, it is possible to regenerate DVDs and CDs by using a common optical system comprising beam splitters 21, 22, collimator lens 7, objective lens 9 and photo detector 11. As a result, an optical pickup apparatus for two kinds of wavelengths with a simple structure can be provided; at the same time, semiconductor lasers 4, 5 can be selectively used to emit a laser beam of a wavelength appropriate for regeneration of each medium.

In addition, in the case of regenerating CD-Rs, first semiconductor laser 4 is used to emit a laser beam of a long wavelength appropriate for the purpose; therefore, CD-Rs can be regenerated without damaging the reflective film.

Transmissivity of first and second slopes 23, 24 is determined by selectively using semiconductor lasers 4, 5 for two kinds of wavelengths and by selectively using polarized beams from the semiconductor lasers to the reflective surface of the beam splitters between a S-polarized beam and P-polarized beam. As a result, the characteristics required for the reflective film formed on each of slopes 23, 24 can be obtained by relatively easy coating. Hence, the reflective film with low dependency to angles and stable performance can be obtained. Also, it is not necessary to place a collimator lens between the semiconductor lasers and beam splitters; a single collimator lens can be used commonly for laser beams L1, L2 with different wavelengths. Therefore, the number of parts can be reduced such that it is advantageous in terms of the costs.

Also, the non-polarizing type, in which a ¼ plate or a polarizing beam splitter is not used, is employed; therefore, a recording medium with large birefringence can be regenerated in a stable manner.

The following describes another embodiment of the optical pickup system of the present invention.

In the above embodiment, first and second slopes are formed as prisms 21, 22; however, it is possible to form first slope 23 as a prism and second slope, that is the slope on the side of photo detector 11, as a horizontal plate, that is a plate mirror.

Also, in the above embodiment, first semiconductor laser 4 and first slope 23 are placed closer to the side of objective lens 9 than second semiconductor laser 5 and second slope 24. However, the reversed positioning of these is possible; that is, second semiconductor laser 5 and second slope 24 can be placed closer to the side of objective lens 9 than first semiconductor laser 4 and first slope 23. In this case, first semiconductor lasers 4 and second semiconductor laser 5 still shall be placed conjugate with collimator lens 7 and photo detector 11.

A diffraction grating can be placed between first semiconductor laser 4 and first slope 23 or between second semiconductor laser 5 and second slope 24. Or, diffraction gratings can be placed both between first semiconductor laser 4 and first slope 23 and between second semiconductor laser 5 and second slope 24. By placing the diffraction grating, each of the laser beams can be separated into zero order light, plus-one order light and minus-one order light such that tracking control by three beams can be performed.

As previously described, the above embodiment employs the non-polarizing type such that dependency of the slopes to angles is low; therefore, the slopes can be placed in the diffuse optical path without serious negative effects. Hence, the collimator lens can be completely omitted to make the optical system definite. As a result, the number of parts can be further reduced such that in turn the costs are decreased.

The combination of first and second semiconductor lasers 4, 5 can be changed. In other words, one semiconductor laser has a P-polarized beam of 780 wavelength, and another has a S-polarized beam of 650 to 630 nm. Also, the wavelengths are not limited to 780 nm and 650 to 630 nm; combinations of other wavelengths can be applied. In addition, the wavelengths of first and second semiconductor lasers can be switched with the positioning of the rest of the optical system remains the same while the mode of the embodiment shown in the figures. In this case, the spectroscopic characteristics and polarization dependency of beam splitters 21, 22 shall be adjusted according to the semiconductor lasers corresponding to these beam splitters 21, 22.

According to the present invention, the lost amount of laser beams emitted from first and second semiconductor lasers is small such that by allowing the laser beams to effectively enter the photo detector, reading can be reliably performed due to the facts that the wavelength of the first semiconductor laser differs from the wavelength of the second semiconductor laser such that the laser beam from the first semiconductor laser is a given polarized beam and the laser beam from the second semiconductor laser is a polarized beam different from the above given polarized beam; and a first reflective portion which partially reflects the laser beam from the first semiconductor laser and which transmits the laser beam from the second semiconductor laser; and a second reflective portion which partially reflects the laser beam from the second semiconductor laser and which transmits the laser beam from the first semiconductor laser.

Also, except for first and second semiconductor lasers, a common optical system comprising the first and second beam splitters, collimator lens, objective lens and photo detector is employed; therefore, regeneration of DVDs and CDs is possible. In addition, an optical pickup apparatus for two kinds of wavelengths with a simple structure can be provided; at the same time, semiconductor lasers can be selectively used to emit a laser beam of a wavelength appropriate for regeneration of each medium.

In the case of regenerating CD-Rs, it is established such that one of the semiconductor lasers is used for emitting a laser beam of a long wavelength appropriate for CD-Rs; therefore, CD-Rs can be regenerated without damaging the reflective film.

Transmissivity of the first and second reflective portion is determined by selectively using the two semiconductor lasers for two kinds of wavelengths and by selectively using polarized beams from the semiconductor lasers to the reflective surface of the beam splitters between a S-polarized beam and P-polarized beam. As a result, the characteristics required for the reflective film formed on each of the slopes can be obtained by relatively easy coating. Hence, the reflective film with low dependency to angles and stable performance can be obtained. Also, it is not necessary to place a collimator lens between the semiconductor lasers and the beam splitters; a single collimator lens can be used commonly for the laser beams with different wavelengths. Therefore, the number of parts can be reduced such that it is advantageous in terms of the costs.

Also, the non-polarizing type, in which a ¼ plate or a polarizing beam splitter is not used, is employed; therefore, a recording medium with large birefringence can be regenerated in a stable manner.

While the foregoing description and drawings represent the preferred embodiments of the present invention, it will be obvious to those skilled in the art that various changes and modifications may be made therein without departing from the true spirit and scope of the present invention.

What is claimed is:

1. An optical pickup apparatus comprising:

a first semiconductor laser emitting a first laser beam having a first wavelength, said first laser beam being one of a P- and S- polarized light beam;

a first beam splitter partially reflecting or transmitting in a predetermined direction the first laser beam emitted by said first semiconductor laser;

a second semiconductor laser emitting a second laser beam having a second wavelength, said second laser beam being the other of said P- and S- polarized light beam, said first and second wavelengths being different;

a second beam splitter partially reflecting or transmitting in said predetermined direction the second laser beam emitted by said second semiconductor laser;

a single collimator lens positioned to receive both the first laser beam reflected or transmitted by the first beam splitter and the second laser beam reflected or transmitted by the second beam splitter;

a single objective lens focussing the first and second laser beams passing through the collimator lens onto a recording medium;

a single photodetector positioned to receive reflected first and second laser beams reflected by said recording medium of said first and second laser beams;

said first beam splitter having formed thereon a first reflective portion for partially reflecting substantially half of the first laser beam emitted from said first semiconductor laser and and for transmitting substantially all of the second laser beam emitted from said second semiconductor laser beam;

said second beam splitter having formed thereon a second reflective portion for partially reflecting substantially half of the second laser beam emitted from said second semiconductor laser and and for transmitting substantially all of the first laser beam emitted from said first semiconductor laser beam, said first and second beam splitters, collimator lens, objective lens, and photodetector being positioned to form a single return path of light reflected from said recording medium, said first and second semiconductor lasers being placed in conjugate with said photodetector and said collimator lens so that both of said beams reflected by said recording medium are detected by said photodetector.

2. The optical pickup apparatus according to claim 1 wherein said first beam splitter is structured with a prism wherein said first reflective portion is formed on the slope of said prism; and said second beam splitter is structured with a different prism wherein said second reflective portion is formed on the slope of said different prism.

3. The optical pickup apparatus according to claim 2 in which a horizontal plate is used replacing said different prism.

4. The optical pickup apparatus according to claim 1 in which a diffraction grating is placed between said first semiconductor laser and said first beam splitter or between said second semiconductor laser and said second beam splitter.

5. The optical pickup apparatus according to claim 1 in which said first and second reflective portions are placed at emitting portions of each laser beam from said first and second semiconductor lasers.

* * * * *